United States Patent [19]

Miller

[11] 4,041,999
[45] Aug. 16, 1977

[54] VEHICLE PROTECTOR

[76] Inventor: Richard E. Miller, 370 "K" St., Apt. No. 66, Chula Vista, Calif. 92010

[21] Appl. No.: 738,384

[22] Filed: Nov. 2, 1976

[51] Int. Cl.² .............................................. B60J 11/00
[52] U.S. Cl. .................................... 150/52 K; 296/136
[58] Field of Search ............ 296/136; 150/52 R, 52 K

[56] References Cited

U.S. PATENT DOCUMENTS

| 2,119,072 | 5/1938 | Cohen | 150/52 K |
|---|---|---|---|
| 2,718,912 | 9/1955 | Zimmerman | 150/52 K |
| 2,994,356 | 8/1961 | Fleming | 150/52 K |
| 3,044,516 | 7/1962 | Stoll | 150/52 R |
| 3,763,908 | 10/1973 | Norman | 150/52 K |
| 3,926,471 | 12/1975 | Nadasi | 150/52 K |

*Primary Examiner*—Ro E. Hart
*Attorney, Agent, or Firm*—Robert D. Farkas

[57] ABSTRACT

A vehicle protector utilizes a plurality of plastic sheets each having one surface thereof covered with a soft resilient material. The soft side of the sheets are disposed covering the outermost surface of the front fenders, the front door panels and the remaining side panels of a motor vehicle. The sheets are cut so as to have their marginal edges substantially conform to the marginal edges of the portions of the vehicle which they are adapted to cover. A pair of elastic bands straddle the front grille portion of the vehicle and are secured to the leading marginal edges of the pair of sheets covering the front fenders. Another pair of elastic members join the pair of sheets covering the front fenders, residing on the hood of the vehicle. Snap fasteners secure the trailing edge of the front fender cover sheets to the body of the vehicle adjacent the leading edge of the front doors. Another pair of sheets cover the front doors and are adapted with openings accommodating door handles and sideview mirrors. The cover sheets for the doors utilize snap fasteners to secure to the leading edge of the front doors and hook-like plastic members to secure the remaining marginal edges of the door cover sheets by capturing portions of the marginal edges of the front doors. A third pair of sheets cover the remaining side panels of the vehicle utilizing plastic hook-like members to capture portions of the marginal edges of the remaining side panels and a third pair of elastic bands, joining to each of the third pair of cover sheets straddling the rear portion of the vehicle.

6 Claims, 4 Drawing Figures

VEHICLE PROTECTOR

BACKGROUND OF THE INVENTION

1. The Field of the Invention

This invention relates to vehicle protectors and more particularly to that class adapted to be removably secured to selected portions of the fenders and side panels of a motor vehicle.

2. Description of the Prior Art

The prior art abounds with vehicle protectors. U.S. Pat. No. 2,994,356 issued on Aug. 1, 1961 to S.W. Fleming teaches a shroud-like cover adapted to entirely enclose the above ground portions of a vehicle utilizing a single flexible sheet assembly therefor.

The Fleming invention is typical of the various devices which totally and completely shroud the vehicle in a tent-like structure.

Such protective devices, though effective for their particular purposes, must be removed before the vehicle may be inspected or operated.

SUMMARY OF THE INVENTION

A primary object of the present invention is to provide a flexible vehicle protector which permits the vehicle to be operated whilst selective portions of the vehicle are afforded protection from road hazards and dirt accumulations.

Another object of the present invention is to provide a vehicle protector which may be easily and conveniently installed and removed from the exterior surface of the vehicle protected thereby.

Still another object of the present invention is to provide a vehicle protector whose vehicle contacting surfaces are appropriately padded thereby protecting the finish of the vehicle.

Yet another object of the present invention is to provide a vehicle protector in accordance with the preceding objects, which is simple in construction, relatively inexpensive and effective for its particular purposes.

Four wheel drive vehicles, such as vans, pick-ups or campers are often subject to the extra hazardous conditions encounytered by driving these vehicles over rough rural roads and terrain. Rock shards, stones or other flying debris can quickly deteriorate the finely finished exterior surfaces of these vehicles. Furthermore, vehicles are oftentimes stored by vehicle dealers for extended periods of time between the date of purchase and date of delivery in open areas. Protective devices tend to minimize the effects of the weather and flying debris caused by adjacent moving vehicles. The present invention provides easily removed flexible covers protecting these vehicles whilst enabling these vehicles to be operated in a normal operating condition.

These objects as well as other objects of the present invention will become more readily apparent after reading the following description of the accompanying drawings.

DESCRIPTION OF THE PREFERRED EMBODIMENT

The structure and method of fabrication of the present invention is applicable to a plurality of flexible sheet members, each adapted to cover selected portions of the body of a motor vehicle. A first pair of sheets may be removably affixed to the front fenders of the vehicle. A second pair of sheets may be removably affixed to the front door panels of the vehicle. A third pair of sheets may be removably affixed to the remaining side panels of the vehicle. A first and second pair of elastic bands join each of the sheets in the first pair of sheets, being adapted to cover the hood portions and the grille portions of the vehicle. The trailing edge of the first pair of sheets utilizes a plurality of snap fastener elements to fasten to complementary snap fastening elements secured to the body of the vehicle along a line parallel to the leading edge of the door panel.

The second pair of sheets utilizes a plurality of hook-like plastic members, preferably fabricated from polyamide plastic, to engage, by capturing the marginal edges of the door panels. Another plurality of snap fasteners are secured to the leading edge of the second pair of sheets engaging another quantity of complementary snap fasteners secured to the motor vehicle along a line parallel to the leading edge of the front doors. Openings are provided for door handles and side view mirror assemblies so that they may protrude through the second pair of sheets. The third pair of sheets utilizes another plurality of plastic hook-like members to engage, by capturing the marginal edges of the remaining side panels of the vehicle. The third pair of elastic bands straddle the rear portions of the vehicle.

The outermost surface of the flexible sheets may be fabricated from a flexible plastic material, possessing waterproof properties, such as polyvinyl chloride plastic.

Figure 1:
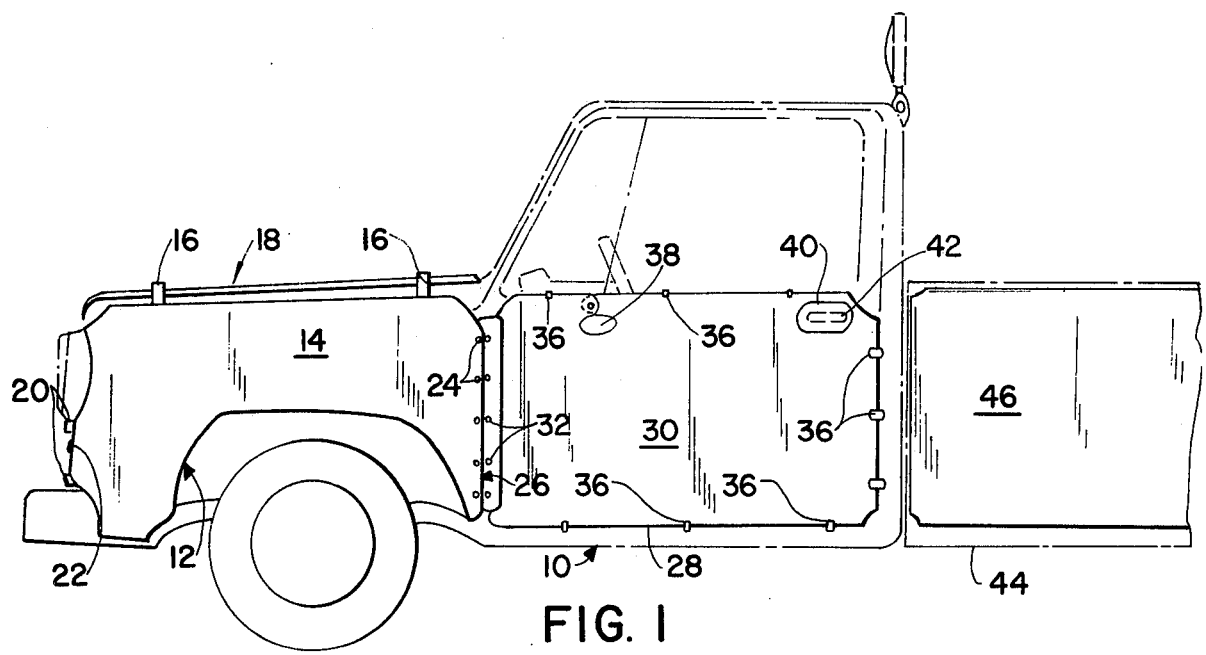
FIG. 1 is a side elevation view of a portion of the present invention shown installed on a motor vehicle.

Now referring to the figures, and more particularly to the embodiment illustrated in FIG. 1 shown a motor vehicle 10 having a front fender 12 shown covered by a flexible sheet 14. The other front fender, not shown, is similarly covered by an equivalent flexible sheet. Elastic bands 16 are secured to flexible sheet 14 and straddle hood portion 18 of the vehicle, joining the other fender covering sheet, not shown. Elastic bands 20 are secured to flexible sheet 14 and straddle the grille 22 of the vehicle, joining the other fender covering sheet, not shown. Snap fasteners 24 are shown secured adjacent the trailing edge 26 of cover sheet 14. They engage a plurality of complementary snap fasteners, not shown, secured to the surface of the vehicle. Motor vehicle 10 is shown having a front door panel 28 covered by a flexible sheet 30. The other front door panel, not shown, is similarly covered by an equivalent flexible sheet. Snap fasteners 32 are shown secured adjacent the leading edge 34 of sheet 30. They engage a plurality of complementary snap fasteners, not shown, secured to the surface of the vehicle. Hook-like members 36 extend outwardly from the marginal edges of sheet 30 and engage the marginal edges of door panel 28 by wrapping around and capturing portions of the marginal edges of the panel. Opening 38 is provided to accommodate an exterior rear side view mirror mounted to the surface of door panel 28. Opening 40 is provided to accommodate door handle 42 permitting convenient access thereto. Motor vehicle 10 is also shown having a side panel 44 covered by a flexible sheet 46. The other side panel, not shown, is similarly covered by an equivalent flexible sheet.

Figure 2:
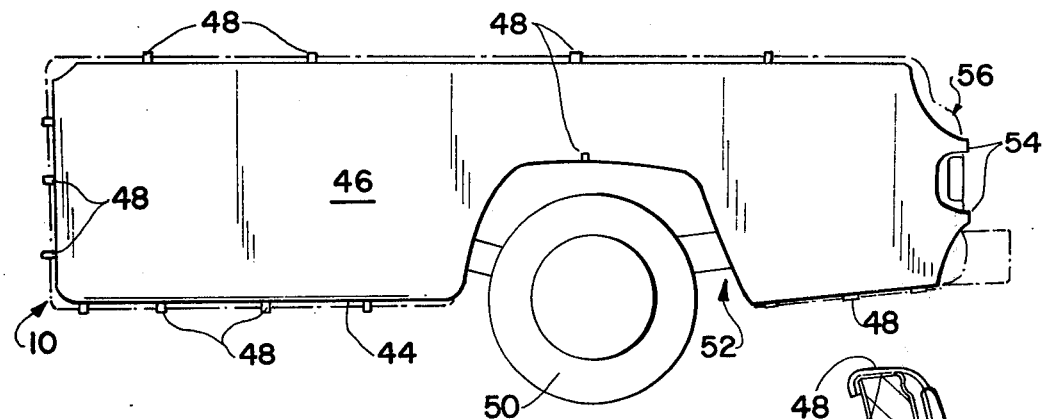
FIG. 2 is a side elevation view of another portion of the present invention shown installed on another portion of a motor vehicle.

FIG. 2 shows the rear portions of motor vehicle 10, having the remaining side panel 44 thereof covered by flexible sheet 46. Hook-like members 48 extend outwardly from the marginal edges of sheet 46 and engage the marginal edges of side panel 44 by wrapping around and capturing portions of the marginal edges of the side panel. At least one hook-like member 48 is disosed within the rear wheel well 52, shown housing wheel 50. Another pair of elastic bands 54 join sheet 46 and the opposed sheet, not shown, by straddling the rear surface 56 of the vehicle.

Figure 3:
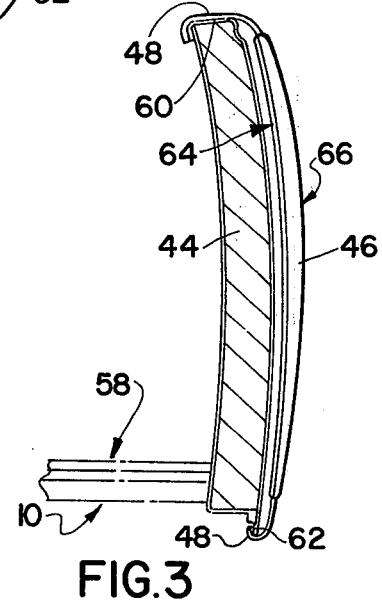
FIG. 3 is a side elevation cross-sectional view of a portion of the present invention and a portion of the vehicle shown in FIG. 2.

FIG. 3 illustrates remaining side panel 44 shown adjacent to the floor 58 of vehicle 10. Hook-like members 48 are shown engaging the marginal edges 60 and 62 of side panel 44. Surface 64 of flexible sheet 46 is comprised of a soft resilient-like material, such as that poly methane foam, laminated to an exterior surface material 66, such as polyvinyl chloride.

Figure 4:
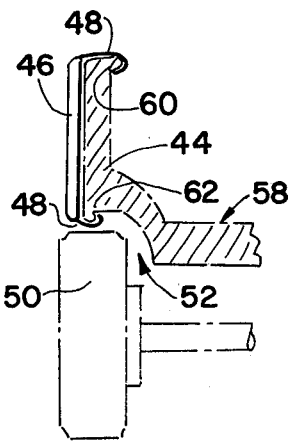
FIG. 4 is a side elevation cross-sectional view of another portion of the present invention and another portion of the vehicle, shown in FIG. 2, including a rear wheel thereof.

FIG. 4 shows rear wheel 50 being disposed accommodated partially within well 52. Side panel 44 is shown residing in part, over wheel well 52, and is covered by a portion of cover sheet 46, utilizing flexible hooks 48 to engage marginal edges 60 and 62 of side panel 44.

One of the advantages of the present invention is a flexible vehicle protector which permits the vehicle to be operated whilst selective portions of the vehicle are afforded protection from road hazards and dirt accumulations.

Another advantage of the present invention is a vehicle protector which may be easily and conveniently installed and removed from the exterior surface of the vehicle protected thereby.

Still another advantage of the present invention is a vehicle protector whose vehicle contacting surfaces are appropriately padded thereby protecting the finish of the vehicle.

Yet another advantage of the present invention is a vehicle protector in accordance with the preceding advantages, which is simple in construction, relatively inexpensive and effective for its particular purposes.

Thus there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention is which an exclusive privilege or property is claimed are defined as follows:

I claim:

1. A vehicle protector comprising a plurality of flexible sheets, one surface of the sheets having a soft resilient-like covering, the other surface of each of the sheets being formed from a flexible plastic waterproof material, a first pair of sheets having marginal edges substantially conforming to the marginal edges of the front fenders of a vehicle, a first elastic flexible band fixedly secured at the ends thereof to each of the sheets of said first pair of sheets, said first flexible band being disposed on the outermost surface of the hood of said vehicle when said first pair of sheets are disposed covering said front fender, a second elastic flexible band being disposed joining each of said first pair of sheets, said second flexible band being disposed covering the grille portion of said vehicle when said first pair of sheets are disposed covering said front fenders, a first plurality of snap fasteners being disposed in spaced apart relationship along one marginal edge of each of said first pair of sheets, said first plurality of snap fasteners being disposed removably secured to first complementary snap fasteners being disposed fixedly secured in spaced apart relationship to the exterior surface of said vehicle along first lines located adjacent to the leading marginal edge of the frontmost doors of said vehicle, a second pair of sheets having marginal edges substantially conforming to the marginal edges to the door panels of said frontmost doors of said vehicle, a second plurality of snap fasteners disposed in spaced apart relationship along one marginal edge of each of said second pair of sheets, a first plurality of hook-like members fixedly secured to and extending outwardly from the other marginal edges of said second pair of sheets, said second plurality of snap fasteners being disposed removably secured to a second plurality of complementary snap fasteners, said second plurality of complementary snap fasteners being disposed fixedly secured in spaced apart relationship along second lines, said second lines being disposed parallel to said first lines, said first plurality of hook-like members being disposed capturing a portion of said marginal edges of said door panels, a third pair of sheets having marginal edges substantially conforming to the substantially vertical remaining side panels of said vehicle, a third elastic flexible band being disposed joining each of said third pair of sheets, a second plurality of hook-like members being disposed fixedly secured to the marginal edges of each of said third pair of sheets, said second plurality of hook-like members being disposed capturing a portion of the marginal edges of said remaining side panels of said vehicle when said third pair of sheets are disposed covering said remaining side panels of said vehicle, said third flexible band being disposed at the rear end of said vehicle when said third pair of sheets are disposed covering said remaining side panels of said vehicle.

2. The vehicle protector as claimed in claim 1 wherein said first and second plurality of hook-like members comprise a plastic material.

3. The vehicle protector as claimed in claim 2 wherein said plastic material comprises polyamide.

4. The vehicle protector as claimed in claim 1 further comprising a first opening in each of said second pair of sheets, each of said first openings being disposed adjacent to an exterior door handle affixed to each of said door panels.

5. The vehicle protector as claimed in claim 1 further comprising a second opening in one of said second pair of sheets, said second opening being disposed adjacent to a side view mirror attachment fixedly secured to one of said door panels.

6. The vehicle protector as claimed in claim 1 wherein said flexible plastic waterproof material comprises polyvinyl chloride.

* * * * *